(12) United States Patent  
Brister

(10) Patent No.: US 8,182,012 B1
(45) Date of Patent: May 22, 2012

(54) TAILGATE EXTENSION APPARATUS

(76) Inventor: Richard Brister, Lafayette, LA (US)

( * ) Notice: Subject to any disclaimer, the term of this patent is extended or adjusted under 35 U.S.C. 154(b) by 0 days.

(21) Appl. No.: 13/165,441

(22) Filed: Jun. 21, 2011

Related U.S. Application Data

(60) Provisional application No. 61/361,158, filed on Jul. 2, 2010.

(51) Int. Cl.
*B62C 1/06* (2006.01)
(52) U.S. Cl. .................. 296/26.11; 296/57.1
(58) Field of Classification Search ............. 296/57.1, 296/26.08, 26.1, 26.11
See application file for complete search history.

(56) References Cited

U.S. PATENT DOCUMENTS

| | | | |
|---|---|---|---|
| 4,531,773 A | 7/1985 | Smith | |
| 5,775,759 A * | 7/1998 | Cummins | 296/26.11 |
| 5,806,907 A | 9/1998 | Martinus et al. | |
| 5,857,724 A | 1/1999 | Jarman | |
| 6,007,127 A * | 12/1999 | Garofalo | 296/26.11 |
| 6,019,410 A | 2/2000 | Trostle et al. | |
| 6,378,926 B1 | 4/2002 | Renze et al. | |
| 6,550,841 B1 | 4/2003 | Burdon et al. | |
| 6,626,478 B1 | 9/2003 | Minton | |
| 7,226,100 B1 | 6/2007 | Willey et al. | |

* cited by examiner

*Primary Examiner* — Joseph Pape

(57) ABSTRACT

An apparatus for increasing the cargo capacity of a pickup truck cargo bed area is disclosed. The apparatus has a base plate attached to the interior side of the tailgate of the pickup truck. A flat rectangular end-wall plate is pivotally attached the base plate. The end-wall plate has pivotally attached sidewall plates that fold, with the end-wall plate, onto the base plate. The truck cargo area is provided with adjustable mounting brackets to secure the sidewall plates to the truck cargo bed area when the apparatus is deployed for use. The apparatus may be folded and secured on the tailgate when it is not in use and unfolded and attached to the sidewall mounting brackets for deployment and use.

10 Claims, 3 Drawing Sheets

TAILGATE EXTENSION APPARATUS

PRIORITY

This application claims priority to U.S. provisional application entitled "Tailgate Extension Apparatus" bearing Ser. No. 61/361,158 filed Jul. 2, 2010, the entire content of which is hereby incorporated by reference.

FIELD OF INVENTION

This invention relates to an after-market apparatus for pickup trucks and, more particularly, relates to an apparatus for combination with the tailgate section of a pickup truck to increase the cargo capacity of the bed of the pickup truck.

SUMMARY OF INVENTION

An after-market apparatus that incorporates the cargo bed of a pickup truck with the tailgate section of the truck in order to increase the cargo capacity of a pickup truck cargo bed is disclosed. The apparatus is configured to be folded away onto the truck cargo bed when it is not in use and to be folded in a manner that maintains a low elevation profile so that the apparatus does not to otherwise impede upon the use of the truck cargo bed.

The apparatus is provided with adjustable latches that will allow the apparatus to be configured by the user to accommodate variously size pickup trucks with variously sized truck beds so that the apparatus may be readily adapted by a user for use with the truck bed of pickup trucks provided by a wide variety of manufacturers. When the apparatus is properly mounted on a pickup truck, in most cases the cargo loaded in the pickup truck bed will not have to be restrained in any other fashion.

Ideally the apparatus is made of a rust resistant metal such as aluminum or stainless steel. However, other materials may be utilized and the apparatus may be painted as desired to match or contrast with the colors of the pickup truck on which it is utilized.

DESCRIPTION OF THE EMBODIMENT

Figure 1:
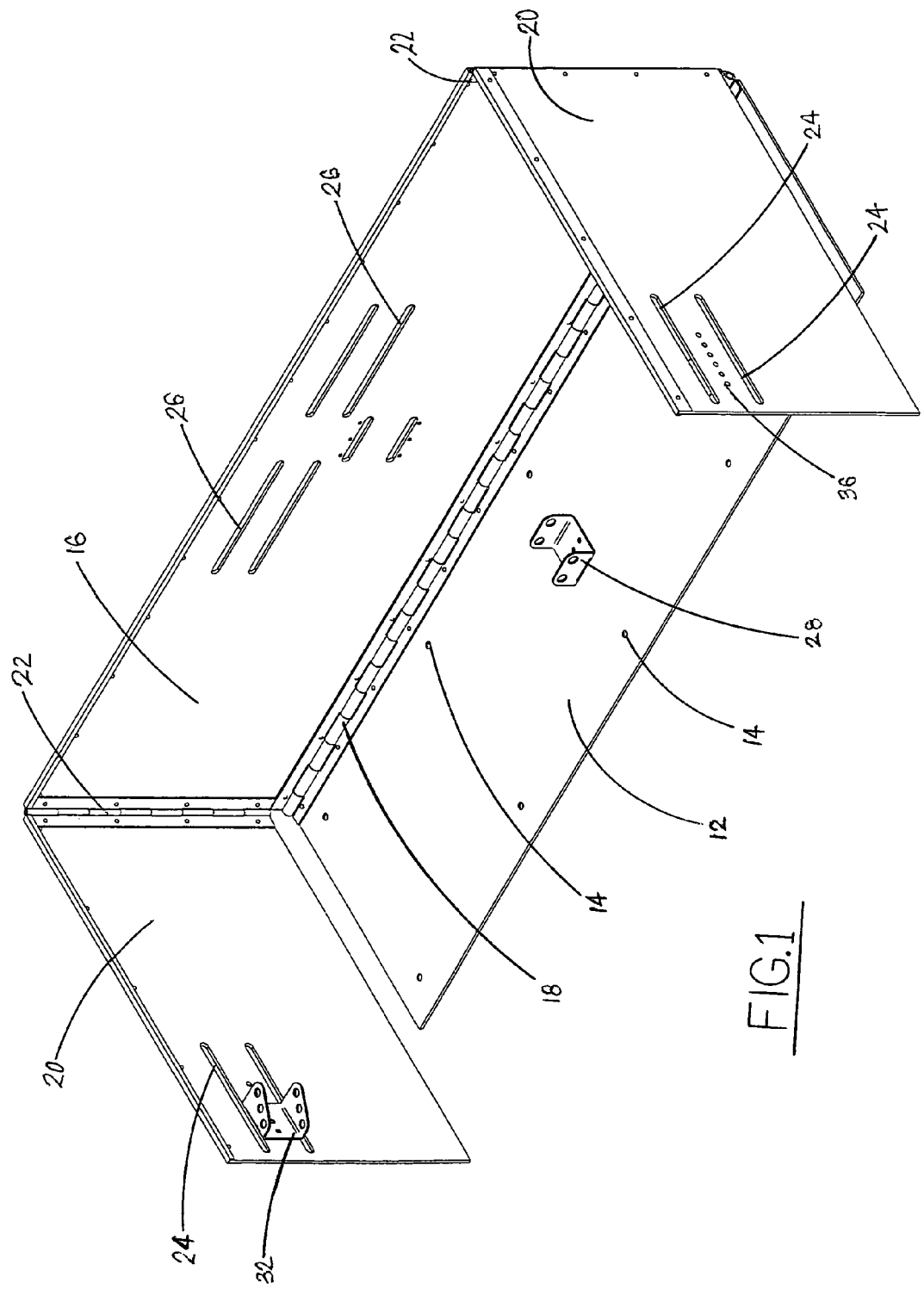
FIG. 1 shows a perspective view of the pickup truck bed extension apparatus.

FIG. 1 shows a perspective view of the pickup truck bed extension apparatus. As shown in FIG. 1, the apparatus (10) is comprised of four sections or plates which are hinged together to form the complete unit. The apparatus (10) has a flat, rectangular base plate (12), a flat, rectangular end-wall plate (16); and two flat wing or sidewall plates (20). The base plate (12) is bolted or otherwise attached to the tailgate of a pickup truck by means of bolt holes (14). The end-wall plate (16) is pivotally attached to the base plate (12) by means of a piano hinge (18). A sidewall plate (20) is pivotally attached to each side end of the end-wall plate (16) by means of piano hinges (22).

Each of the sidewall plates (20) of the apparatus (10) may be folded upon the end-wall plate (16) by means of the hinges (20) and the end-wall plate (16) may be folded down flat upon the base plate (12) by means of the hinge (18), and hence flat upon the tailgate of the pickup, when the apparatus (10) is not in use. Slots (24) on the sidewall plates (20) and slots (26) on the end-wall plate (16) are provided so that when the end-wall plate (16) and sidewall plates (20) are folded upon the base plate (12), they may be secured in place by means of a U-shaped base bracket assembly (28) mounted on the base plate (12). The base bracket assembly (28) has outwardly extend flanges (23) each with mounting holes (25) for receiving bracket pins (not shown) to hold the sidewall plates (20) and the end-wall plate (16) flat upon the base plate (12).

Figure 3:
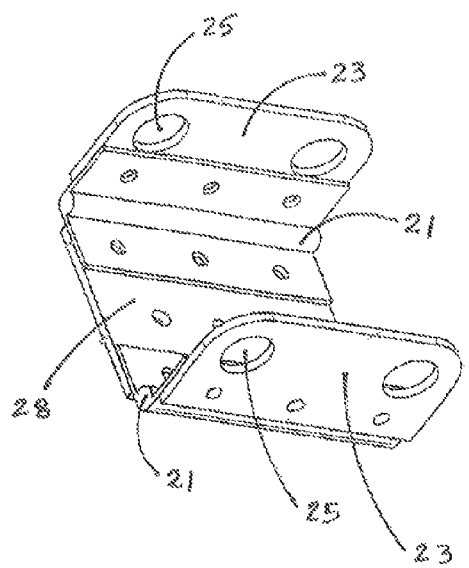
FIG. 3 is an embodiment of the base bracket assembly.

As shown in FIG. 3, the U-shaped base bracket assembly (28) may have hinges (21) for pivotal attachment of the outwardly ending flanges (23). This pivotal attachment of the flanges (23) of the bracket assembly (28) will allow the flanges (23) to fold relatively flat to accommodate cargo in the bed of the pickup truck when the apparatus (10) is deployed and in use.

When the sidewall plates (20) and end-wall plate (16) are fully extended, as shown in FIG. 1, the slots (24) on each sidewall plate (20) are utilized to attach the sidewall plates (20) to the sidewalls of a pickup truck bed by means of truck sidewall brackets (30) and bed extender wing or wall brackets (32). A plurality of mounting holes (36) is provided in sidewall plates (20) to adjust the placement of the bed extender wall brackets (32) on the sidewall sections (20). The attachment of the sidewall plates (20) to the sidewalls of a pickup truck bed is shown in FIG. 2.

Figure 4:
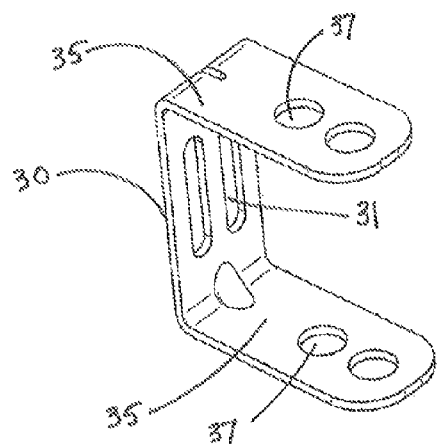
FIG. 4 is an embodiment of the truck sidewall bracket.

As shown in FIG. 4, the truck sidewall brackets (30) are U-shaped and are comprised of upper and lower extending flanges (35). Each of the flanges (35) has a plurality of pin retainer holes (37). Slots (31) are provided for attachment of the truck sidewall brackets (30) to the interior sidewalls of a pickup truck bed by means of bolts or screws (not shown).

Figure 5:
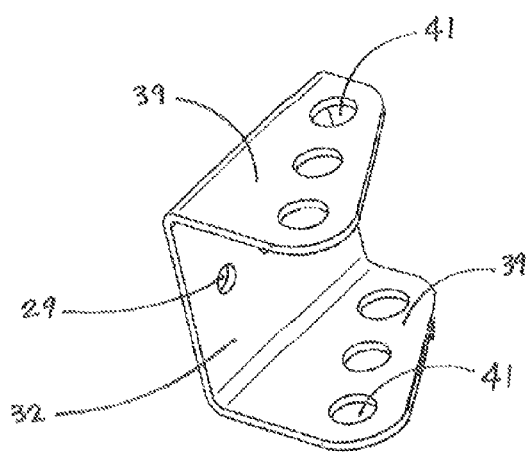
FIG. 5 is an embodiment of the bed extender wall bracket.

As shown in FIG. 5, the bed extender wall brackets (32) are U-shaped with upper and lower extending flanges (39) each having a plurality of pin retainer holes (41). Mounting holes (29) are provided for attachment of the bed extender wall brackets (32) to the interior surface of the sidewall plates (20) by means of bolts or screws (not shown).

Figure 2:
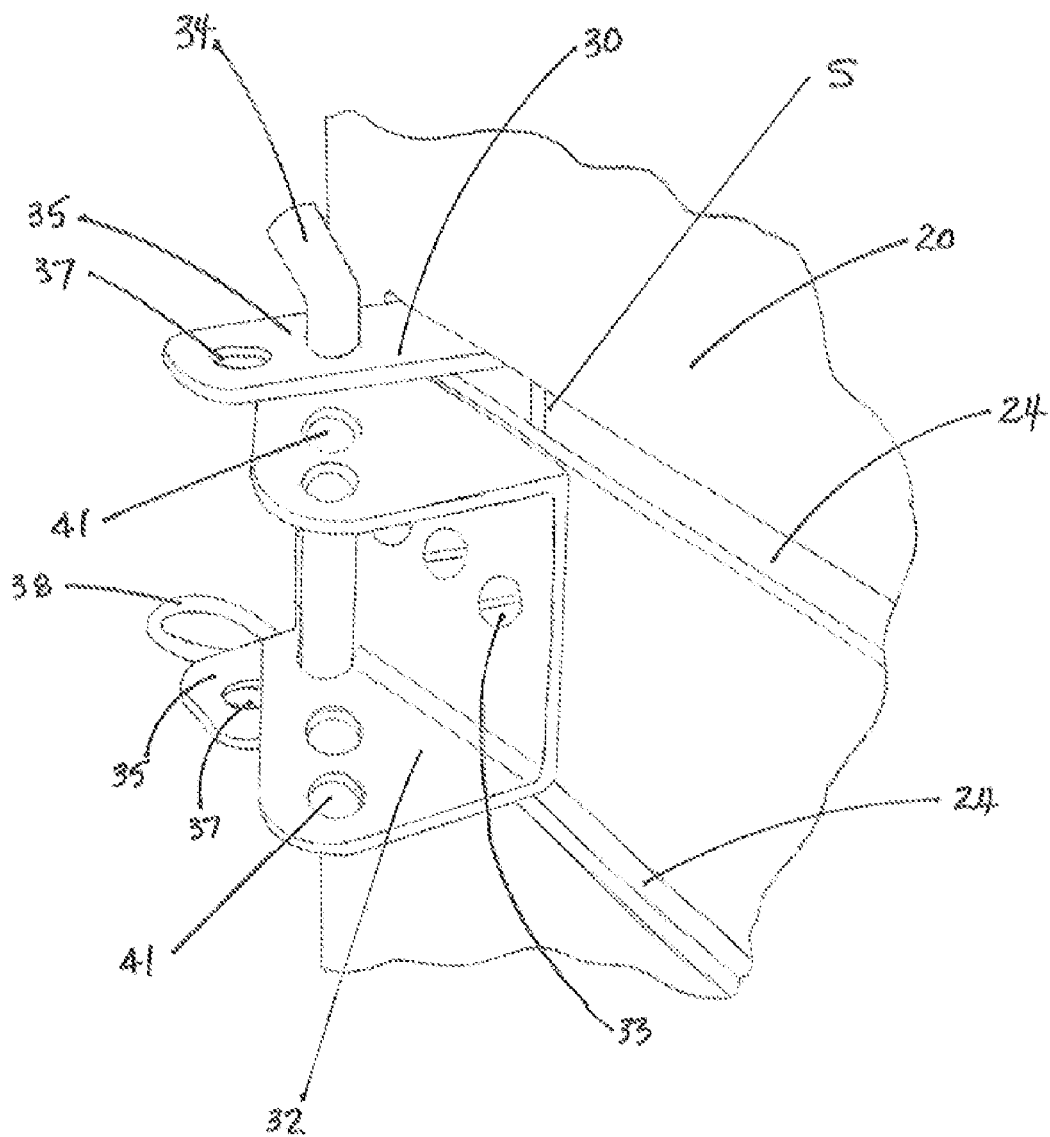
FIG. 2 shows a detail view of the truck sidewall bracket and bed extender wall bracket and pin connection of the apparatus shown in FIG. 1.

The attachment of a sidewall plate (20) to the sidewall of a pickup truck bed is shown in FIG. 2. As shown in FIG. 2, the flanges (35) of the truck sidewall brackets (30) correspond generally with the flanges (39) of the bed extender wall brackets (32) so that the pin retainer holes (37) of the truck sidewall brackets (30) may be aligned with the pin retainer holes (41) of the bed extender wall brackets (32) for receiving sidewall pins (34) to secure the brackets (30) and (32) together. The plurality of mounting holes (37) and (41) for brackets (30) and brackets (32), respectively, serve to provide a variety of mounting options for the various sizes of truck beds provided by truck manufacturers.

As further shown in FIG. 2, truck sidewall brackets (30) are mounted onto the sidewall (S) of the pickup truck cargo area by mounting holes and bolts, machine screws, or other fastening means (not shown). The bed extender brackets (32) are mounted on the sidewall sections (20) by means of bolts (33) and mounting holes (29) on brackets (32) and are configured to correspond with the truck sidewall brackets (30). The sidewall section (20) is held in place along the interior the sidewall of the pickup truck bed by the truck sidewall brackets (30) and bed extender brackets (32), the flanges of which cooperate with a sidewall retainer pin (34). The sidewall retainer pins (34) may be provided with a cotter pin (38) to further secure the pins (34) on the brackets (30, 32). The sidewall retainer pins (34) may also be used as the bracket retainer pins of the base bracket assembly (28) so as to provide a storage place for the sidewall retainer pins (34) when the apparatus (10) is not is use. The slots (24) on each sidewall plate (20) are configured with a length sufficient to provide for placement of sidewall brackets (30) at a desired location on the sidewalls of the pickup truck.

To install the apparatus (10) on a pickup truck, the base plate (12) of the apparatus (10) is bolted or otherwise attached to the tailgate of a pickup truck by means of bolt holes (14) and bolts (not shown). A truck sidewall bracket (30) is mounted on each interior sidewall of the pickup truck cargo area at a desired location so as to correspond with a bed extender bracket (32) that is positioned on each of the sidewall sections (20). When mounted as shown in FIG. 2, the flanges (35) of each of the truck sidewall brackets (30) will be received by the slots (24) of a sidewall plate (20) and the mounting holes (37) on the flanges (35) will correspond with selected mounting holes (41) on the flanges (39) of the bed extender brackets (32) when each of the sidewall sections (20) are extended.

When the tailgate is up and the apparatus (10) is not in use, the sidewall sections (20) fold inward by means of hinges (22) over the end-wall plate (16) and the end-wall plate (16) is then folded down by means of hinge (18) over the base plate (12). The apparatus (10) is then held in place on the tailgate of the pickup by means of the slots (24, 26), the base bracket assembly (28), and pins (34).

When the tailgate is down and the apparatus (10) is to be placed in use, the end-wall plate (16) is unfolded up perpendicular to the base plate (12) by means of hinge (18). The sidewall plates (20) may then be unfolded and extended outward by means of hinges (22). The sidewall plates (20) of the apparatus (10) are then detachably held in place on the sidewalls of the pickup by means of the cooperating slots (24) of the sidewall sections slots (24), the mounting holes (37) and (41) of brackets (30) and brackets (32), respectively, and the pins (34) which fit into the mounting holes (37) and (41) of each of the brackets (30, 32).

It is thought that the apparatus (10) of the present invention and many of its attendant advantages will be understood from the foregoing description and it will be apparent that various changes may be made in the arrangement of the parts thereof without departing from the spirit and scope of the invention or sacrificing all of its material advantages, the apparatus (10) described herein being merely an exemplary embodiment of the invention.

I claim:

1. An apparatus for increasing the cargo capacity of a pickup truck cargo area comprising:
    (a) a pickup truck, said pickup truck having a truck cargo area formed by a truck bed, first and second interior sidewalls, and a tailgate, said tailgate having an interior and an exterior wall;
    (b) a flat, rectangular base plate, said base plate attached to said interior wall of said tailgate of said pickup truck cargo area;
    (c) a flat, rectangular end-wall plate pivotally attached to said base plate, said end-wall plate having first and second ends, said end-wall plate having dimensions corresponding to said base plate dimensions;
    (d) first and second flat sidewall plates, said first sidewall plate pivotally mounted to said first end of said end-wall plate, said second sidewall plate pivotally mounted to said second end of said end-wall plate;
    (e) means for attaching said first sidewall plate to said first interior sidewall of said pickup truck cargo area, said means including a bracket adjustably mounted to said first sidewall plate; and
    (f) means for attaching said second sidewall plate to said second interior sidewall of said pickup truck cargo area, said means including a bracket adjustably mounted to said second sidewall plate.

2. The apparatus as recited in claim 1, further comprising:
    (a) a first sidewall plate hinge, said first sidewall plate hinge pivotally mounting said first sidewall plate to said first end of said end-wall plate;
    (b) a second sidewall plate hinge, said second sidewall plate hinge pivotally mounting said second side-wall plate to said second end of said end-wall plate; and
    (c) an end-wall hinge, said end-wall hinge pivotally mounting said end-wall to said base plate whereby said first and second end-walls may be folded upon said end-wall plate and whereby said end-wall plate with said folded first and second sidewall plates may be folded down flat upon said base plate.

3. The apparatus as recited in claim 2, further comprising means for securing said end-wall plate with said folded first and second sidewall plates to said base plate.

4. An apparatus for increasing the cargo capacity of a pickup truck cargo area comprising:
    (a) a pickup truck, said pickup truck having a truck cargo area formed by a truck bed, first and second interior sidewalls, and a tailgate, said tailgate having an interior and an exterior wall;
    (b) a flat, rectangular base plate, said base plate attached to said interior wall of said tailgate of said pickup truck cargo area;
    (c) a flat, rectangular end-wall plate pivotally attached to said base plate, said end-wall plate having first and second ends, said end-wall plate haying dimensions corresponding to said base plate dimensions;
    (d) first and second flat sidewall plates, said first sidewall plate pivotally mounted to said first end of said end-wall plate, said second sidewall plate pivotally mounted to said second end of said end-wall plate;
    (e) means for attaching said first sidewall plate to said first interior sidewall of said pickup truck cargo area;
    (f) means for attaching said second sidewall plate to said second interior sidewall of said pickup truck cargo area;
    (g) a first sidewall plate hinge, said first sidewall plate hinge pivotally mounting said first sidewall plate to said first end of said end-wall plate;
    (h) a second sidewall plate hinge, said second sidewall plate hinge pivotally mounting said second side-wall plate to said second end of said end-wall plate;
    (i) an end-wall hinge, said end-wall hinge pivotally mounting said end-wall to said base plate whereby said first and second end-walls may be folded upon said end-wall plate and whereby said end-wall plate with said folded first and second sidewall plates may be folded down flat upon said base plate;
    (j) means for securing said end-wall plate with said folded first and second sideman plates to said base plate; and
    (k) wherein:
        (i) said first and second sidewall plates each have a plurality of mounting slots;
        (ii) said end-wall plate has a plurality of mounting slots, said end-wall mounting slots corresponding with said mounting slots on said first and second sidewall plates when said sidewall plates are folded onto said end-wall plate; and (iii) wherein said means for securing said end-wall plate with said folded first and second sidewall plates to said base plate is a U-shaped base bracket mounted on said base plate, said U-shaped base bracket having outwardly extending flanges, said extending flanges having mounting holes, whereby a mounting pin may be positioned through said flange mounting holes of said extending flanges of said U-shaped base bracket when said flanges are positioned through said mounting slots of said first and second sidewall plates and said mounting slots of said end-wall plate.

5. The apparatus as recited in claim 4 wherein said flanges of said U-shaped base bracket are pivotally attached to said U-shaped base bracket.

6. The apparatus as recited in claim 5 wherein:
   (a) said means for attaching said first sidewall plate to said first interior sidewall of said pickup truck cargo area includes a first truck sidewall bracket mounted on first interior sidewall of said pickup truck cargo area; and
   (b) said means for attaching said second sidewall plate to said second interior sidewall of said pickup truck cargo area includes a second truck sidewall bracket mounted on said second interior sidewall of said pickup truck cargo area; and
   (c) wherein said first and said second truck sidewall brackets are U-shaped brackets having outwardly extending flanges, said flanges having mounting holes whereby a mounting pin may be positioned through said flange mounting holes.

7. The apparatus as recited in claim 6, further comprising:
   (a) a first bed extender bracket positioned on said first sidewall plate, said first bed extender bracket having outwardly extending flanges, said flanges having a plurality of mounting holes, whereby said first truck sidewall bracket will be received by said slots of said first sidewall plate and whereby selected mounting holes on said first bed extender bracket will correspond with said mounting holes on said first truck sidewall bracket for receiving a first retaining pin;
   (b) a second bed extender bracket positioned on said second sidewall plate, said second bed extender bracket having outwardly extending flanges, said flanges having a plurality of mounting holes, whereby said second truck sidewall bracket will be received by said slots of said second sidewall plate and whereby selected mounting holes on said second bed extender bracket will correspond with said mounting holes on said second truck sidewall bracket for receiving a second retaining pin.

8. An apparatus for increasing the cargo capacity of a pickup truck cargo area comprising:
   (a) a pickup truck, said pickup truck having a truck cargo area formed by a truck bed, first and second interior sidewalls, and a tailgate, said tailgate having an interior and an exterior wall;
   (b) a flat, rectangular base plate, said base plate ached to said interior wall of said tailgate of said pickup truck cargo area;
   (c) a flat, rectangular end-wall plate, said end-wall plate having first and second ends;
   (d) a first and a second flat sidewall plate, each said sidewall plate having a plurality of mounting slots;
   (e) a first sidewall hinge, said first sidewall hinge pivotally mounting said first sidewall plate to said first end of said end-wall plate;
   (f) a second sidewall hinge, said second sidewall hinge pivotally mounting said second side-wall plate to said second end of said end-wall plate;
   (g) an end-wall hinge, said end-wall hinge pivotally mounting said end-wall to said base plate whereby said first and second end-walls may be folded upon said end-wall plate and whereby said end-wall plate with said folded first and second sidewall plates may be folded down flat upon said base plate;
   (h) a first truck U-shaped sidewall bracket mounted on said first interior sidewall of said pickup truck cargo area, said first sidewall bracket having outwardly extending flanges, said flanges having mounting holes whereby a mounting pin may be positioned through said flange mounting holes;
   (i) a second truck U-shaped sidewall bracket mounted on said second interior sidewall of said pickup truck cargo area, said second sidewall bracket having outwardly extending flanges, said flanges having mounting holes whereby a mounting pin may be positioned through said flange mounting holes;
   (j) a first bed extender bracket positioned on said first sidewall plate, said first bed extender bracket having outwardly extending flanges, said flanges having a plurality of mounting holes, whereby said first truck sidewall bracket will be received by said slots of said first sidewall plate and whereby selected mounting holes on said first bed extender bracket will correspond with said mounting holes on said first truck sidewall bracket for receiving a first retaining pin; and
   (k) a second bed extender bracket positioned on said second sidewall plate, said second bed extender bracket having outwardly extending flanges, said flanges having a plurality of mounting holes, whereby said second truck sidewall bracket will be received by said slots of said second sidewall plate and whereby selected mounting holes on said second bed extender bracket will correspond with said mounting holes on said second truck sidewall bracket for receiving a second retaining pin.

9. The apparatus as recited in claim 8, wherein:
   (a) said end-wall plate has a plurality of end-wall mounting slots, said end-wall mounting slots corresponding with said mounting slots of said first and second sidewall plates when said sidewall plates are folded onto said end-wall plate;
   (b) a U-shaped base bracket attached to said base plate, said U-shaped base bracket having outwardly extending flanges, said flanges having mounting holes;
   (c) a mounting pin, whereby when said flanges of said U-shaped base bracket are positioned through said mounting slots of said first and second sidewall plates and said end-wall mounting slots of said end-wall plate, said end-wall plate, with said folded first and second sidewall plates, may be secured to said base plate by means of inserting said mounting pin through said mounting holes of said U-shaped bracket.

10. The apparatus as recited in claim 9 wherein said outwardly extending flanges of said U-shaped bracket are pivotally attached to said U-shaped bracket.

* * * * *